United States Patent Office 2,918,305
Patented Dec. 22, 1959

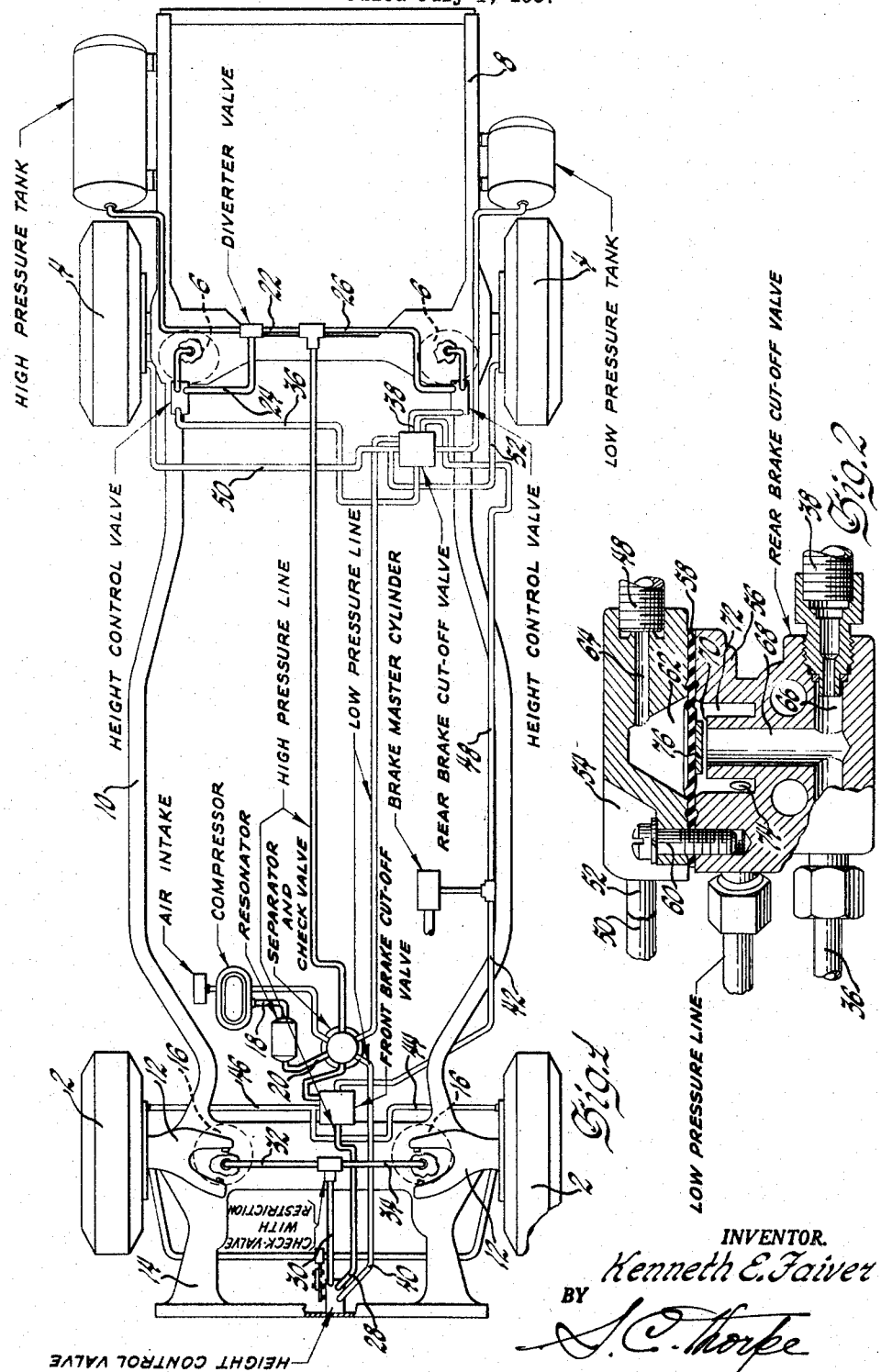

2,918,305

AIR SUSPENSION SYSTEM WITH PITCH CONTROL

Kenneth E. Faiver, Lansing, Mich., assignor to General Motors Corporation, Detroit, Mich., a corporation of Delaware Application July 1, 1957, Serial No. 669,046

2 Claims. (Cl. 280—124)

When the brakes of automotive vehicles are applied the forward ends thereof usually dip or "dive" downwardly and the rear ends tend to rise, the amount depending on the suddenness and the forcefulness of the braking action. Since automotive vehicles having pneumatic suspensions are provided with so-called "leveling valves" which tend to maintain the deflection between the sprung and unsprung portions of the vehicle a predetermined amount at all times, the diving or dipping at the front ends and rising at the rear ends resulting from a brake application operates these leveling valves to increase air pressure in the air springs at the front end of the vehicle and to reduce the pressure in the air springs at the rear of the vehicle in well-known way. Since, as can be appreciated, this unnatural attitude of the vehicle during braking may occur over a relatively long period of time, considerable "pumping up" of the front end springs and deflating of the rear end springs may occur. This results during the period immediately following release of the brakes in the vehicle assuming the unnatural attitude of a high front end and low rear end which is further accentuated by subsequent acceleration of the vehicle. The unnatural attitude assumed by the vehicle may temporarily cause the front end ride to be unnaturally hard and the rear end ride to be unnaturally soft. A more important objection, however, to the maladjusted height condition, which results from the braking operation, is the readjustment which begins to take place immediately after the car has been stopped. When the car has been brought to a complete standstill by braking, for example at a red light, while waiting, the car readjusts by lowering the front end and raising the rear end. This produces an unpleasant sensation to the car occupants and often gives the illusion that the car is fixed and the surrounding objects are shifting position. All this occurs at a time when it is expected that the car should be stationary since the braking operation has been completed.

To avoid the above conditions, the present invention has been proposed which in a unique manner in effect renders the leveling valves at the front and rear ends of the vehicle ineffective to connect the springs to the air pressure source (in the case of the front end) and the low pressure line (in the case of the rear end) during a brake application.

For a better understanding of the invention and the objects thereof, reference may be had to the accompanying detailed description taken in conjunction with the single sheet of drawings which in Fig. 1 represents a view in plan of a vehicle chassis having schematically provided thereon the pneumatic air suspension and brake systems including the novel means for preventing leveling action of the suspension system during braking of the vehicle.

Fig. 2 is an enlarged view with parts in section showing in detail one of the brake cut-off valves used to achieve the asserted purpose.

Referring now to the figures, an automotive chassis is shown which includes front and rear wheels 2 and 4, respectively. The rear wheels 4 are connected together in the present instance by a differential and axles in differential and axle housings and support through the intermediaries of rear end air suspension springs 6 the rear end 8 of a chassis frame 10. The air springs 6 are of the inflatable type including the usual upper and lower containers hermetically connected together by a flexible diaphragm interposed therebetween so as to resiliently support the sprung portion 8 of the chassis on the unsprung portion thereof, which unsprung portion in the present example constitutes the wheels 4 and the differential and rear axle housing. The front end of the vehicle includes wishbone assemblies 12 wherein the lower wishbone member is in a conventional way pivoted to the front end 14 of frame 10 with the front end air springs 16 interposed between the lower arms of wishbone assemblies 12 and front end 14, so that the sprung portion 14 is resiliently supported by the lower wishbone members which are connected by the usual knuckle and kingpin assemblies to the wheels 2 also constituting unsprung vehicle portions. The air springs 16 at the front end of the vehicle are similar to the springs 6 located at the rear end thereof. In addition to the springs 6 and 16, the air suspension also includes an air intake, a compressor, a resonator, a separator and check valve, high and low pressure lines, a high pressure tank, a diverter valve, and a low pressure tank, all so labeled. In addition to the components just mentioned, the suspension system also includes for each of the rear air springs 6 a height control valve, also so labeled. These height control valves at the rear end of the vehicle are individually responsive to deviations from a predetermined deflection between sprung portion 8 and the unsprung portion of the vehicle generally at the same locations as the valves. Similarly, at the front end of the vehicle a single control valve, also so labeled, is shown which serves to control the air pressure in springs 16 in response to deflection between sprung and unsprung portions at the front end of the vehicle intermediate springs 16.

The air springs 6 at the rear end of the vehicle may be connected by their associated height control valves to the compressor via piping 18, the resonator, pipe 20, separator and check valve, the high pressure line, pipes 22, 24 to one height control valve and pipe 26 to the other height control valve. The front end springs 16 may also be connected to the compressor by the front end height control valve via pipe 18, the resonator, pipe 20, the separator and check valve, the front brake cut-off valve, so labeled, pipe 28, the front end height control valve, and pipes 30, 32 and 34. The rear end springs 6 also may be connected by their associated height control valves to the low pressure line returning via the separator and check valve to the compressor by the piping 36, 38, the rear brake cut-off valve, so labeled, and the low pressure line. Similarly, the front air springs 16 may also be connected to the low pressure line via piping 32, 34, pipe 30, the front end height control valve, and pipe 40.

The brake system of the vehicle includes the usual brake master cylinder which is manually operated by the operator's foot to increase the pressure therein causing a brake application and containing hydraulic fluid which is connected via piping 42, front brake cut-off valve, and lines 44 and 46 to the front wheel brake cylinders (not shown). The brake master cylinder is also connected to the rear wheel brake cylinders via the line 48, the rear brake cut-off valve and lines 50 and 52.

It should be appreciated at this point that if the brakes of the vehicle are applied in a normal manner, the sprung portion of the front end of the vehicle will tend to dip down causing the front end height control valve to increase the air pressure in the springs 16. When the brakes are then subsequently released, the front end as a consequence of the increased pressure in spring 16 will be higher than the rear end which is undesirable, not only because of the unnatural attitude of the vehicle but because at least temporarily these springs will be much stiffer than the rear springs. At the same time, the sprung portion of the rear end of the vehicle will tend to rise causing the height control valves associated therewith to connect springs 6 to the low pressure line which, when the brakes are subsequently released, will result in the rear end of the sprung portion of the vehicle riding much lower than the front end and with springs 6 having an unnaturally soft characteristic (depending, of course, on the length and forcefulness of the brake application). Thus, at least momentarily assuming that the brakes have been applied and then released, the vehicle as mentioned will not only have an unnatural attitude with the springs at the front end providing a relatively hard ride and the springs at the rear end a relatively soft ride, but a readjustment in the height will take place resulting in the previously mentioned unpleasant sensation to the vehicle occupant. The conditions heretofore assumed are without the addition of the present invention.

From the detailed description so far given it will be noted that the rear end of the vehicle is provided with a rear brake cut-off valve and that the front end is provided with a front brake cut-off valve. Since, however, these valves are similar both in structure and operation, it is believed necessary to describe only one of the valves in detail. Such a valve is shown in Fig. 2 with pipe connections made such that it actually constitutes in the present application the rear brake cut-off valve. This valve includes a valve head 54 and a valve body 56 separated by a diaphragm 58 clamped therebetween by studs 60 fastening the three parts together. Formed in the head 54 and having as a lower wall diaphragm 58 is a chamber 62 to which is connected via port 64 one end of line 48 which leads from the master brake cylinder. Also in constant communication with chamber 62 are lines 50 and 52 leading to the rear wheel cylinders of wheels 4. The body 56 of rear brake cut-off valve includes a lower passage 66 extending therethrough to which is connected by suitable fittings the ends of pipes 36 and 38 which lead to the respective rear height control valves for the rear springs 6. The passage 66 is in communication with an upwardly extending passage 68 which leads past valve seat 70 into a chamber 72. The low pressure line is connected to chamber 72 via port 74. Located in chamber 72 is a small plate valve 76 which is fixed to the diaphragm 58 and normally maintained off its seat 70 by the resilient tension in diaphragm 58. However, if the pressure is increased in chamber 62, plate valve 76 will engage seat 70 thereby disconnecting chamber 72 and the low pressure line from passage 68 and the exhaust lines 36 and 38 leading from the rear end height control valves. The operation of the composite air suspension and brake systems is as follows.

Assuming the vehicle to be moving with the proper deflection between the sprung and unsprung portions thereof when the brakes are applied, application of the brakes will, of course, increase the fluid pressure in the master brake cylinder thereby increasing the fluid pressure in the lines 48, passage 64, chamber 62, and lines 50, 52, leading to the rear brake cylinders causing an application of the brakes. At the same time, pressure will also increase in chamber 62 thereby causing valve 76 to seat and disconnecting the rear height control valves from the low pressure line, since this rear brake cut-off valve is in series with these rear height control valves. As a result thereof, even though the rear sprung portions of the vehicle rise causing the height control valve exhaust ports to open to exhaust air from the springs 6, no air will be exhausted therefrom because of closing of valve 76 disconnecting the lines 36 and 38 from the low pressure line. Valve 76 will remain closed until the brakes are released at which time the pressure in chamber 62 is relieved and the rear height control valves are again connected to the low pressure line.

Although the front brake cut-off valve has not been shown in detail, its operation and structure are similar to the rear brake cut-off valve with the following differences. Since there is only one height control valve at the front end, only one of the connections to the passage 66 in the lower body of the valve is needed but it is important to note that the connection to passage 66 in the case of the front end will be to the high pressure line and the pipe or line 28 should be connected to the port 74. In other words, high pressure connections at the front end to the front brake cut-off valve should be substituted for the low pressure connections to the rear brake cut-off valve. The reason for this is that the front end of the vehicle dips downwardly on a brake application thus reducing the normal deflection between the sprung and unsprung portions of the vehicle at the front end which causes the height control valve to call for more air pressure to be supplied to the springs 16. With the front brake cut-off valve, however, no such additional air may be supplied to these springs during a brake application since the high pressure line is now cut off by valve 76 from the compressor or high pressure line and the front end height control valve will remain cut off from the high pressure side until the brakes are released.

From the foregoing it may be appreciated that a composite automotive air suspension and brake system has been provided which enables brake applications to be made without adversely affecting the suspension.

I claim:

1. An automotive vehicle which includes a fluid suspension system and a brake system, said suspension system comprising a spring at the rear end of said vehicle between sprung and unsprung portions thereof and a low pressure line, valve means between said low pressure line and said spring responsive to deviations from a predetermined deflection between said sprung and unsprung portions to connect said spring to said low pressure line, said brake system including fluid operated brakes and a master brake cylinder connected thereto, valve means connected in series with said first mentioned valve means between said low pressure line and said spring, said second mentioned valve means being connected to said brake master cylinder and responsive to predetermined increases in pressure therein causing applications of said brakes to prevent connection of said spring to said low pressure line.

2. In combination in an automotive vehicle a pneumatic air suspension system comprising at the rear end thereof a pneumatic spring between sprung and unsprung portions of the vehicle, a low pressure line, rear valve means between said low pressure line and said spring responsive to deflection greater than a predetermined deflection between sprung and unsprung portions of the vehicle at the rear end thereof to connect said spring to said low pressure line, and first brake cut-off valve means in series with said rear valve means between said low pressure line and said spring, said system further including at the front end thereof a spring between sprung and unsprung portions of the front end of the vehicle, a pressure source, front valve means between said front end spring and said pressure source responsive to deflection less than a predetermined deflection between said front end sprung and upsrung portions to connect said front end spring to said pressure source, and second brake cut-off valve means in series with said front end spring and said pressure source and said front valve means, said brake system including a brake master cylinder, said cut-off valves being responsive to an increase pressure in said master cylinder caused by an application of the brakes of said system to prevent said front and rear valves from connecting said rear air spring to said low pressure line at the rear end of the vehicle and said front air pressure spring to the said air pressure source at the front end of the vehicle during a brake application.

References Cited in the file of this patent

UNITED STATES PATENTS

| | | |
|---|---|---|
| 2,131,014 | Sanford | Sept. 20, 1938 |
| 2,687,311 | Nallinger | Aug. 24, 1954 |
| 2,787,475 | Jackson | Apr. 2, 1957 |
| 2,844,384 | Jackson | July 22, 1958 |

FOREIGN PATENTS

| | | |
|---|---|---|
| 202,778 | Australia | Aug. 6, 1956 |